United States Patent [19]
Hamada et al.

[11] Patent Number: 4,766,590
[45] Date of Patent: Aug. 23, 1988

[54] LOOP TRANSMISSION SYSTEM HAVING PLURAL STATIONS CONNECTED IN A VARIABLE ORDER

[75] Inventors: Takuji Hamada, Hitachiohta; Masahiro Takahashi; Kotaro Hirasawa, both of Hitachi; Jushi Ide, Mito; Hitoshi Fushimi; Seiichi Yasumoto, both of Hitachi, all of Japan

[73] Assignee: Hitachi, Ltd., Tokyo, Japan

[21] Appl. No.: 792,319

[22] Filed: Oct. 28, 1985

[30] Foreign Application Priority Data

Oct. 31, 1984 [JP] Japan .................................. 59-227759

[51] Int. Cl.⁴ .......................... H04Q 11/00; H04J 3/00
[52] U.S. Cl. .......................................... 370/56; 370/86
[58] Field of Search ....................... 370/86, 85, 56, 13, 370/55; 340/825.5, 825.05, 825.06

[56] References Cited
U.S. PATENT DOCUMENTS

| 4,393,497 | 7/1983 | Cantwell, Jr. ........................ 370/86 |
| 4,547,879 | 10/1985 | Hamelin et al. ...................... 370/86 |
| 4,554,659 | 11/1985 | Blood et al. .......................... 370/86 |
| 4,559,624 | 12/1985 | Roos et al. ............................ 370/56 |
| 4,583,088 | 4/1986 | Bux et al. .............................. 370/86 |

Primary Examiner—Douglas W. Olms
Assistant Examiner—Curtis Kuntz
Attorney, Agent, or Firm—Antonelli, Terry & Wands

[57] ABSTRACT

A loop transmission system having a plurality of data processor connected through respective transmission station with a common loop transmission line is disclosed. This system has a concentrator connected with a plurality of transmission stations through respective loop transmission lines. The concentrator changes the order of connection said loop transmission lines thereby to change the order of connected of said transmission stations on said loop transmission lines.

8 Claims, 14 Drawing Sheets

LOOP TRANSMISSION SYSTEM HAVING PLURAL STATIONS CONNECTED IN A VARIABLE ORDER

BACKGROUND OF THE INVENTION

The present invention relates to a loop transmission system having transmission stations connected by loop transmission lines and, more particularly, to a loop transmission system suitable for a digital integrated ring network in which data terminals and non-data terminals can coexist as data processors connected with the transmission stations.

Typical prior art technique for a digital integrated ring network, is described in papers such as C & C—NET LOOP 6830 Universal Link System: NEC Technical Report Vol. 36, No. 7/1983: Ito et al., pp. 32 to 38. In the transmission system disclosed in this report, the circuit exchange function is realized by a plurality of time sharing time slots. This requires a number of the aforementioned time slots, when a large volume of traffic such as digitized video data is to be processed as the transfer data, and the amount of network simultaneous storage is severely limited. For ring network topology, there exists a system employing a star network in which the respective relay lines are concentrated at one place, as is disclosed in "A Local Communications Network Based on Inter-connected Token-Access Rings: A Tutorial: IBM J. RES. DEVELOP Vol. 27, No. 5, 1983: C. Strole: pp. 481 to 496. However, this system aims at improving its reliability, and the circuit switching means called a "wiring concentrator" has a construction and operation designed only to bypass a a malfunctioning station but it does not improve the transmission performance of the system in the least.

SUMMARY OF THE INVENTION

An object of the present invention is to provide a loop transmission system having a variable station order, which can multiplex and store the traffic necessary for the high speed transfer of a large volume of data such as digital video data in a loop network.

According to the present invention, the relay lines of a loop network are concentrated in one place, where the order of connection of transmission stations is changed in accordance with a transfer requirement, by noting that the circuit switching is suitable for data which is to be stored for a long time, but must be instantly retrievable, whereas the packet switching by the loop network is suitable for the other data so that the combination of the two makes it possible to integrate data transfer having different traffic characteristics on one transmission line; and that the loop network is capable of making simultaneous transmissions of plural stations for the same time period if the receiving station is positioned downstream of and adjacent to the sending station.

PREFERRED EMBODIMENTS OF THE INVENTION

Figure 1:
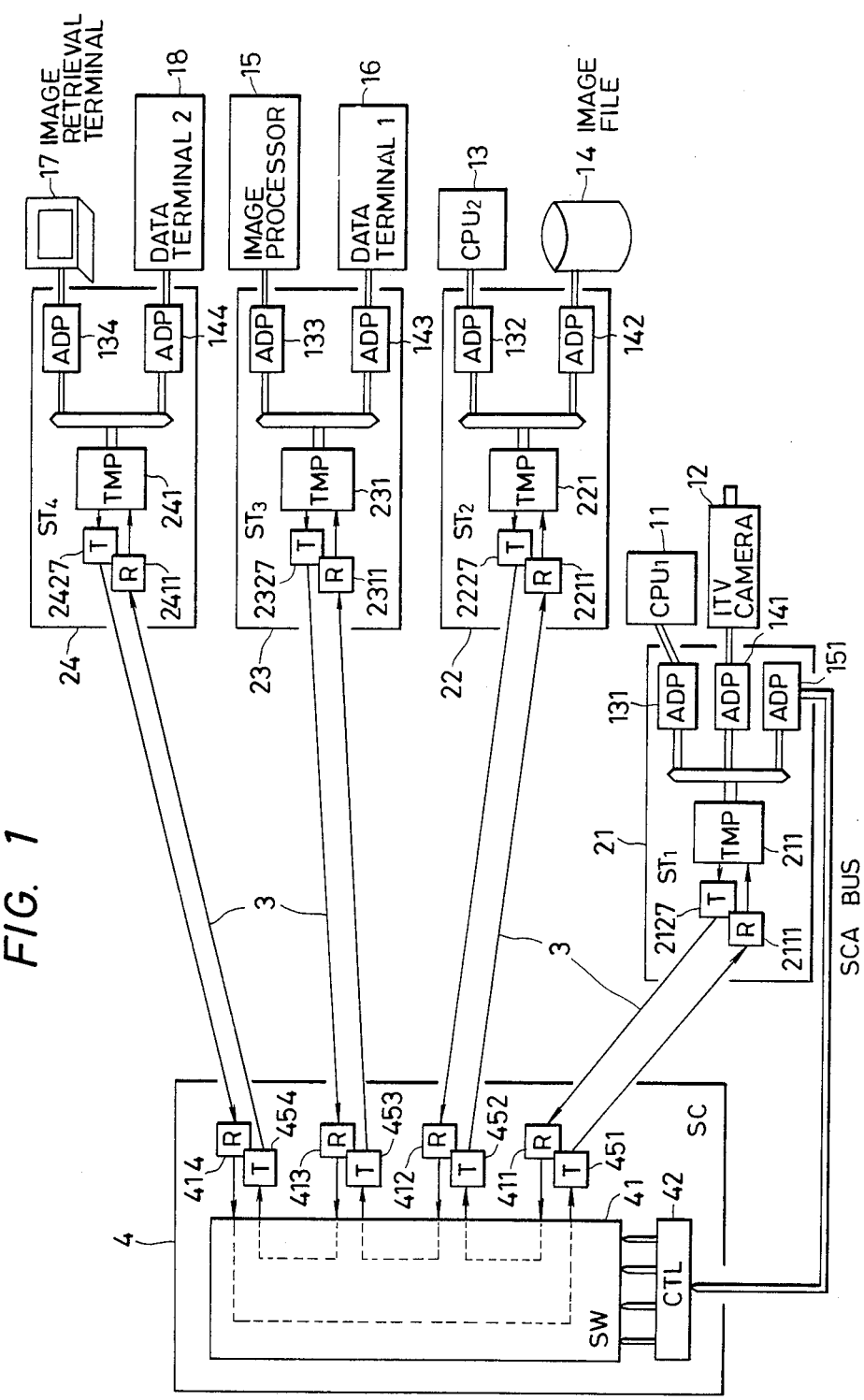
FIGS. 1, 2 and 3 are diagrams showing the construction of the loop transmission system having the variable connection order and expressing the characteristics of the present invention.

The present invention will be described in connection with one embodiment thereof with reference to FIG. 1. FIG. 1 shows an example of the overall structure of a loop network to which the present invention is applied. As shown, a variety of data processors 11 to 18 such as computers or terminals, which are widely distributed in factories, office buildings and universities, interface on a one loop transmission system through transmission stations 21 to 24, respectively, to transfer data among themselves. Here, each transfer station is constructed of a transmitter (T) 2127, 2227, 2327 or 2427, a receiver (R) 2111, 2211, 2311 or 2411, a time slot multiplex control unit 211, 221, 231 or 241, and an equipment adaptor 131 to 134, 141 to 144, or 151. The transmission stations are connected in a loop by bit-serial transmission lines 3, and these lines are concentrated at a concentrator 4 called a "stream changer" to form a star ring network. Here, the stream change is constructed of transmitters 451 to 454, receivers 411 to 414, switching means 41 and switching control means 42. As shown, the judgement as to how to make the connection order is conducted by an equipment adaptor (ADP) 151 of the transmission station 21, and its instruction is delivered to the switching means (CTL) 42. The illustrated connection order is the transmission stations 21, 22, 23 and 24, as indicated by the broken lines in the switching control means 41. The Figure shows the example in which four transmission stations are respectively connected with two data processors. Despite this, however, the present invention does not aim to limit the numbers of the stations and the processors. These respective components will be described sequentially in the following.

Now, the data processors to be connected with the transmission stations are classified into the following two kinds from their transferring traffic characteristics:

(1) Type 1: in which data must be instantly transferred after being held for a long time; and (2) Type 2: in which immediate retrieval is not required so strictly for data transfer and a short holding time is typical.

In the structural example of FIG. 1, the equipment of the type 1 is exemplified by the ITV camera 12 and the image processor 15 and by the color still image file 14 and the image reference terminal 17, whereas the equipment of type 2 is exemplified by the computers 11 and 13 and their data processing terminals 16 and 18. In the system shown, moreover, that data having different traffic characteristics can coexist on the same transmission system. Generally speaking, it is well known in the art that the circuit exchange is suitable for the former data whereas the packet exchange is suitable for the latter data. In order to realize this, according to the present invention, the connection order in the stream changer 4 is controlled such that the transmission station 23 connected with the image processor 15 is located just downstream of the transmission station 21 accommodating the ITV camera 12, and such that the transmission station 24 connected with the image locating terminal 17 is located downstream of the transmission station 22 accommodating the image file 14 acting as the sender.

Figure 2:
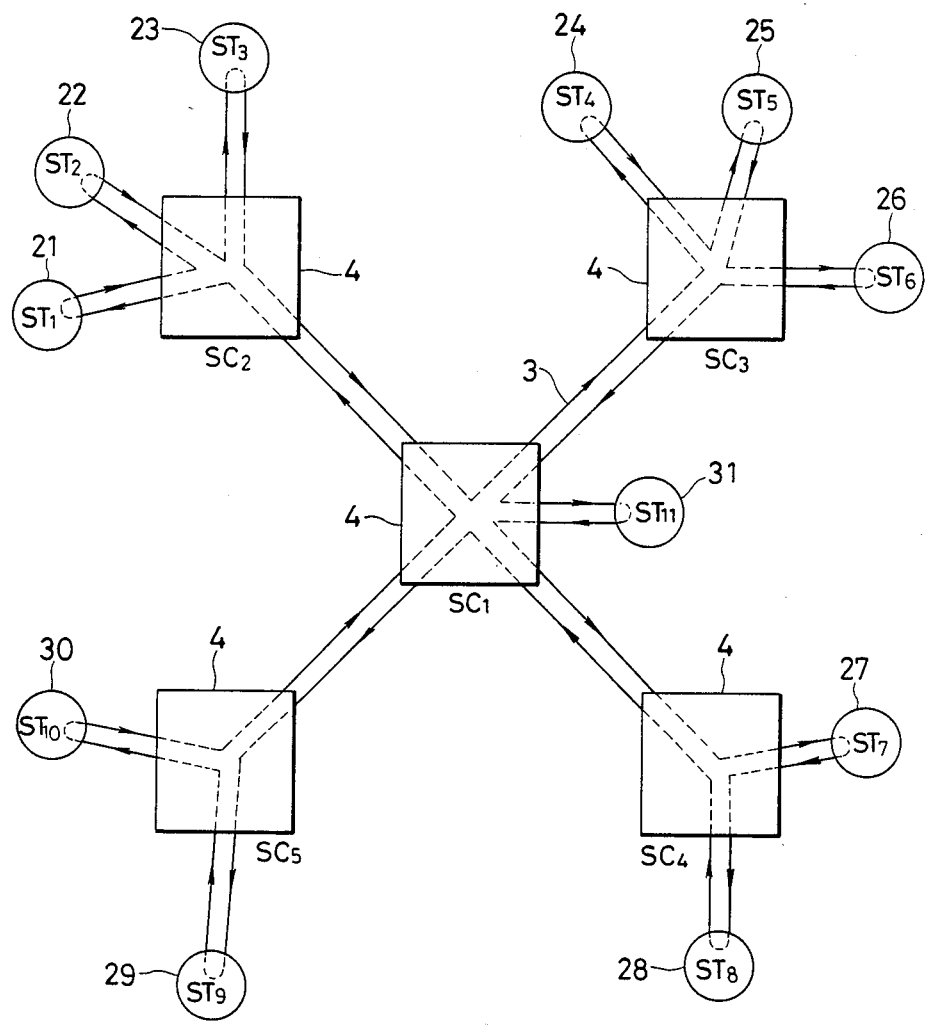
Figure 3:
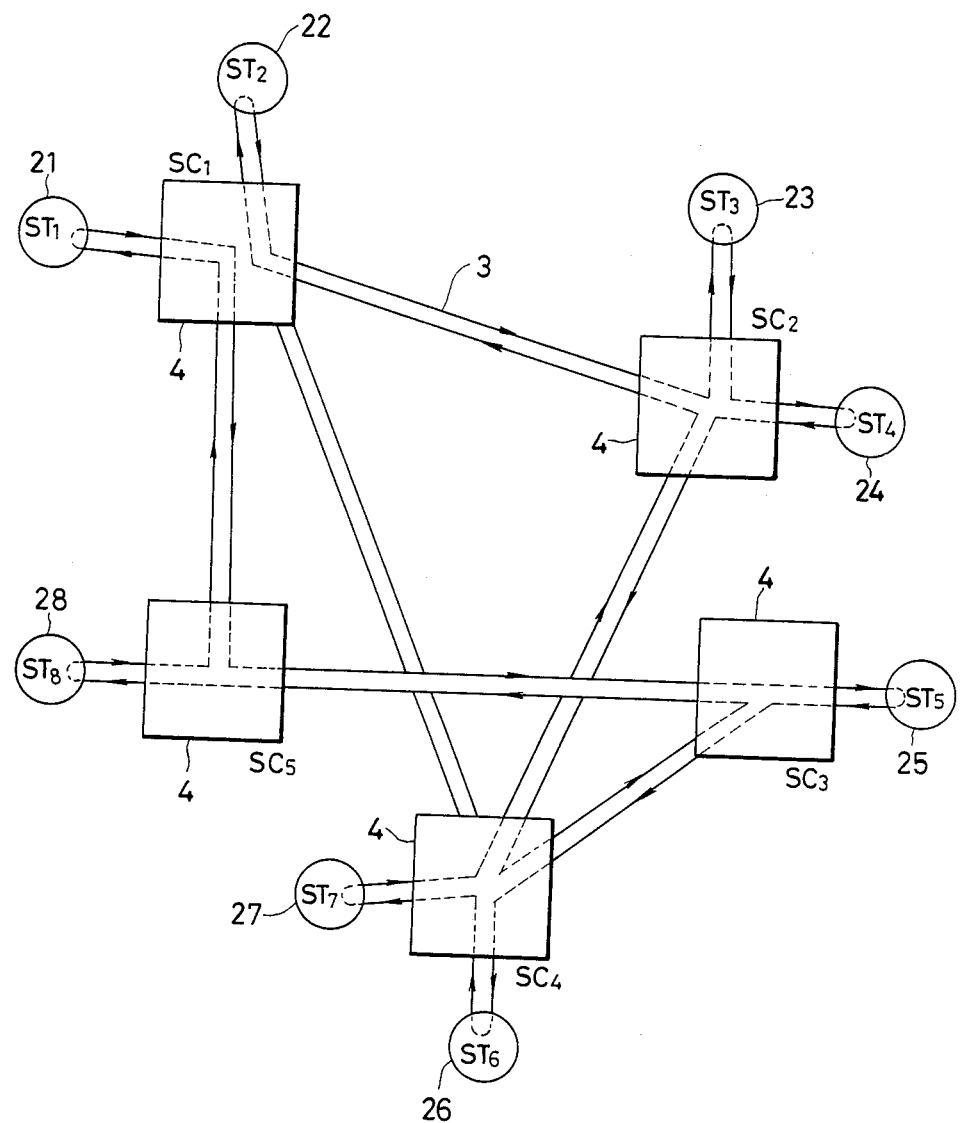

Now, the description referring to FIG. 1 is directed to the case in which the stream changer is one having the star-ring network shape in the system, but the transmission system according to the present invention should not be limited thereto. More specifically, FIG. 2 shows an example of a distributed star-ring network configuration which is composed of a plurality of stream changes. For simplicity of illustration, incidentally, components other than the transmission stations, the stream changers and the transmission lines are not shown. The present shape is advantageous in that it is possible to shorten the transmission line length and to limit the number of transmission stations connected with the stream changers, when the scale of the system applied is so large that the system has more transmission stations and a longer distance between the transmission stations than those of the system of FIG. 1. FIG. 3 shows an example in which the ring network is constructed in a mesh configuration. This case can better withstand the obstruction to transmission because a portion of the line joining the stream changers, i.e., the line portion between $SC_1$ and $SC_4$ in this example can be constructed so as to be a redundant preparatory line.

Figure 4:
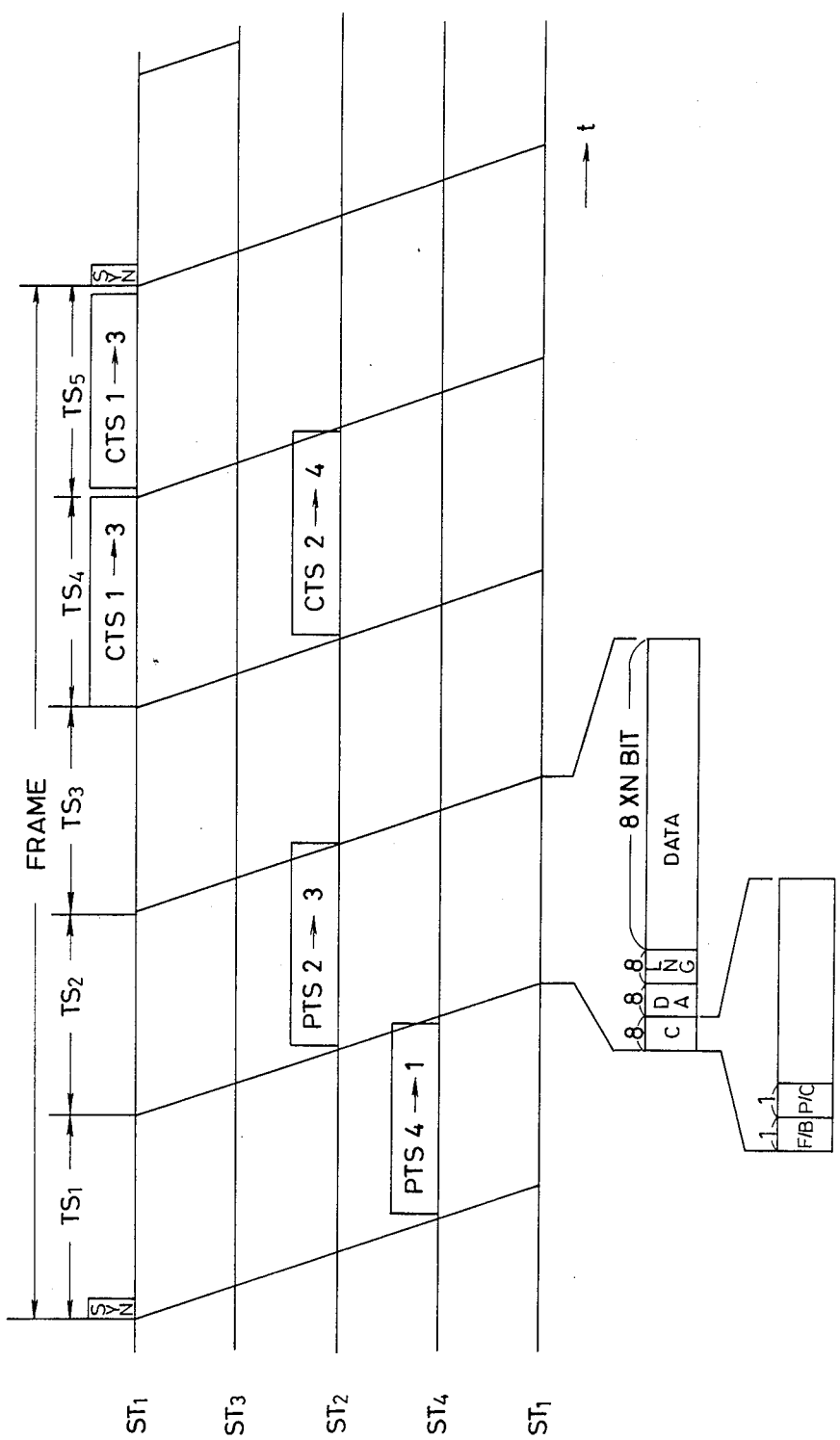
FIG. 4 is a transmission time chart and a format diagram.

In order to explain the operations of the respective portions according to the transmission system of the present invention, an example of the transmission time chart is shown in FIG. 4. Moreover, the present example corresponds to the case in which the following traffic occurs simultaneously in the system structure of FIG. 1:

(i) A video signal is sent out from the ITV camera of the transmission station 21 ($ST_1$) to the image processor 15 of the transmission station 23.

(ii) A still image is sent out from the image file 14 of the transmission station 22 ($ST_2$) to the image reference terminal 17 of the transmission station 24.

(iii) The state data of the plant is sent out from the data terminal 18 of the transmission station 24 ($ST_4$) to the computer 11 of the transmission station 21.

(iv) The control data of the plant is sent out from the computer 13 of the transmission station 22 ($ST_1$) to the data terminal of the transmission station 23.

The data format of multiplexed signals transmitted through the transmission line is repetition of a plurality of (e.g., five in this example) time slots called a "frame". The frame synchronization for recognizing the order of the time slot is achieved by detecting a frame synchronization character SYN. The synchronization character can be realized by various methods such as the unique bit pattern or the violation of code pattern, but details are omitted here. The respective time slots have the common structure of a fixed length and are composed of three characters: a time slot control character C as header data; a destination address character DA for designating a receiving transmission station or equipment; and a data length character LNG indicating the effective data length in the time slot. The portion in the time slot other than the header data is stored with the data DATA resulting from the free format for each device. The time slot control C contains, as shown, an F/B bit expressing the occupation state of said time slot, and a P/C bit for discriminating whether said time slot is used for the data transfer of the aforementioned type 1 or 2.

In the present Figure: the aforementioned traffic (iii) is processed by using the time slot $TS_1$; the traffic (iv) by the time slot $TS_2$; the traffic (i) by the time slots ($TS_4$ and $TS_5$); and the traffic (ii) by the time slot $TS_4$. Here, it should be noted that time slots are used exclusively by some stations for the transfer of data of the traffic type 1, whereas other time slots are used commonly by a plurality of stations for the transfer of data of type 2. This indicates that the present system can simultaneously transfer data of type 1 on the same time slot.

Figure 5:
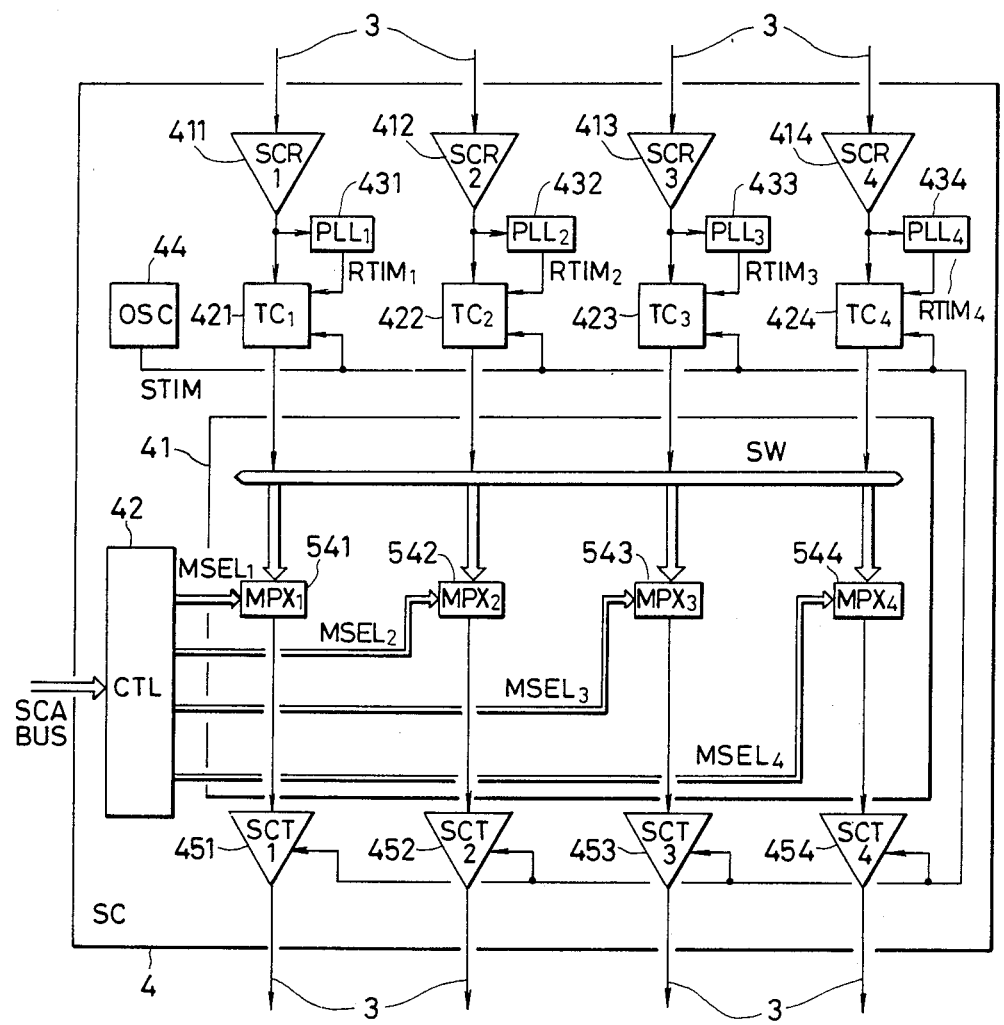
FIG. 5 is a diagram showing the structure of the connection order change-over means.

Next, specific embodiments of the respective components for realizing a transmission system according to the present invention will be described in the following. First of all, the hardware structure of the stream changer 4 will be described with reference to FIG. 5. The present changer 4 is constructed basically of switching means 41 and switching control means 42 for controlling the former, as has been described hereinbefore. Moreover, the present embodiment requires signal transmitting and receiving units because it is an active transmission line. The receivers 411 to 414 have their inputs permanently connected to the transmission stations, respectively, to have functions of signal amplification, waveform equalization and so on. Bit synchronizers (PLL) 431 to 434 extract timing RTIM from the signal received. Timing converters (TC) 421 to 424 are composed mainly of FIFO (i.e., First in First Out) registers to absorb the phase differences and fluctuations between the sending and receiving timing. A sending clock STIM is supplied from an oscillator (OSC) 44. The switching means 41 is composed of multiplexers (MPX) 541 to 544 because the data flow may be unidirectional. All the input signals to said multiplexers are identical to the outputs of the timing converters (TC) 421 to 424. The respective selection signals $MSEL_1$ to $MSEL_4$ are supplied from the switching controller (CTL). The transmitters (SCT) 451 to 454 are used to re-transmit the outputs of the multiplexers (MPX) 541 to 544 to the lines and are permanently connected to the respective transmission stations like the receivers.

Figure 6:
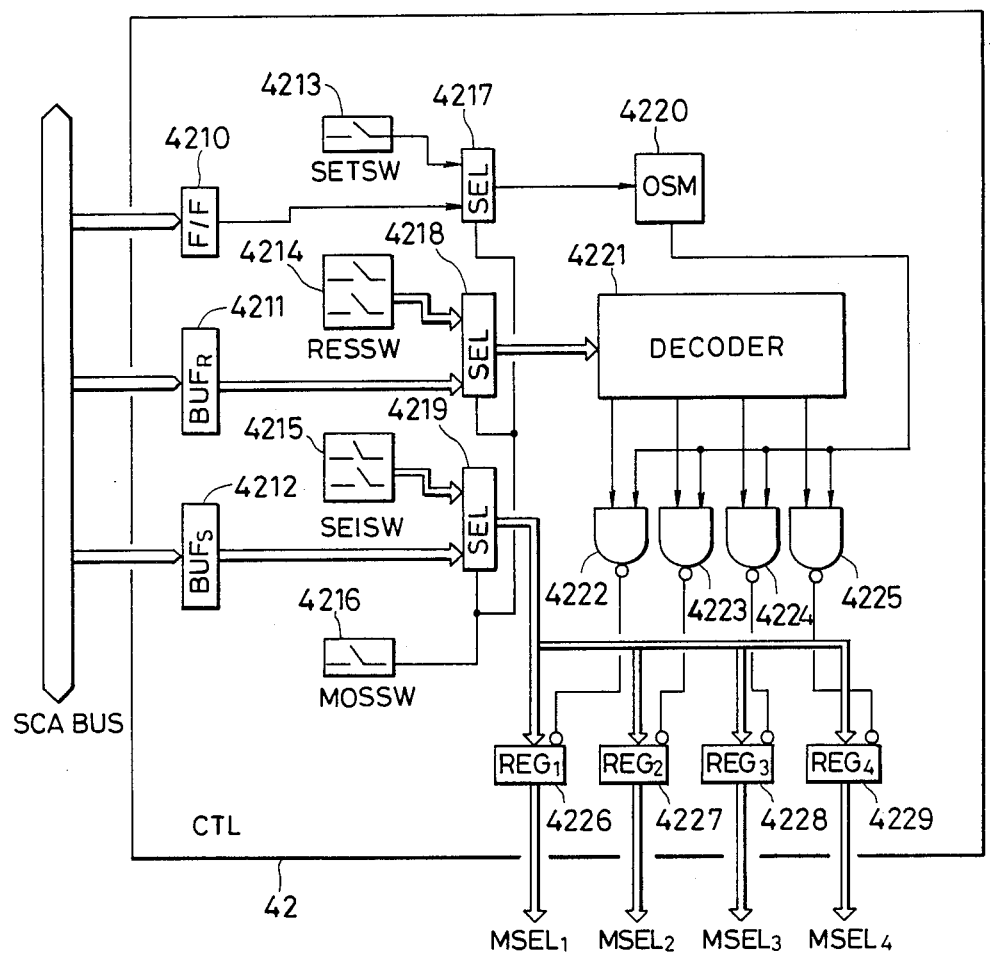
FIG. 6 is a diagram showing the structure of the change-over control means.

FIG. 6 shows the detailed structure of the switching control means (CTL) 42. This means is constructed such that it can change the connection order of the transmission stations by the following:

(1) manual switch; or (2) external setting means.

Which of these is to be selected is switched by a mode selecting switch 4216. The change of the order of connection of the transmission stations may be conducted by sequentially changing the values of the multiplexer selection signals $MSEL_1$ to $MSEL_4$ in the change-over means 41 and requires registers 4226 to 4229 which hold those values. All the inputs to said registers are supplied from a multiplexer (SEL) 4219, and the selection data to the respective registers is stored on a time sharing basis. The storing timing is generated by the circuit which is composed of a one-shot multi-vibrator (OSM) 4220, a decoder 4221 and NAND gates 4222 to 4225. More specifically, only the register that is selected in accordance with the register selection data input to the decoder 4221 is fed as a register write timing with a pulse signal having a certain width, which is prepared by the one-shot multi-vibrator 4220. The output of either a set switch (SET SW) 4213 or a set timing flip-flop 4210 is selected by a multiplexer (SEL) 4217 and fed to the input to the one-shot multivibrator 4220. Likewise, the output of either a register selecting switch (RES SW) 4214 and a register selecting data storage buffer (BUF) 4211 is selected by a multiplexer (SEL) 4218 and is fed to the input to the decoder 4221. Moreover, the multiplexer (SEL) 4219 selects the output of either a selection data switch (SEI SW) 4215 and a selection data storage buffer (BUF) 4212.

Figure 7:
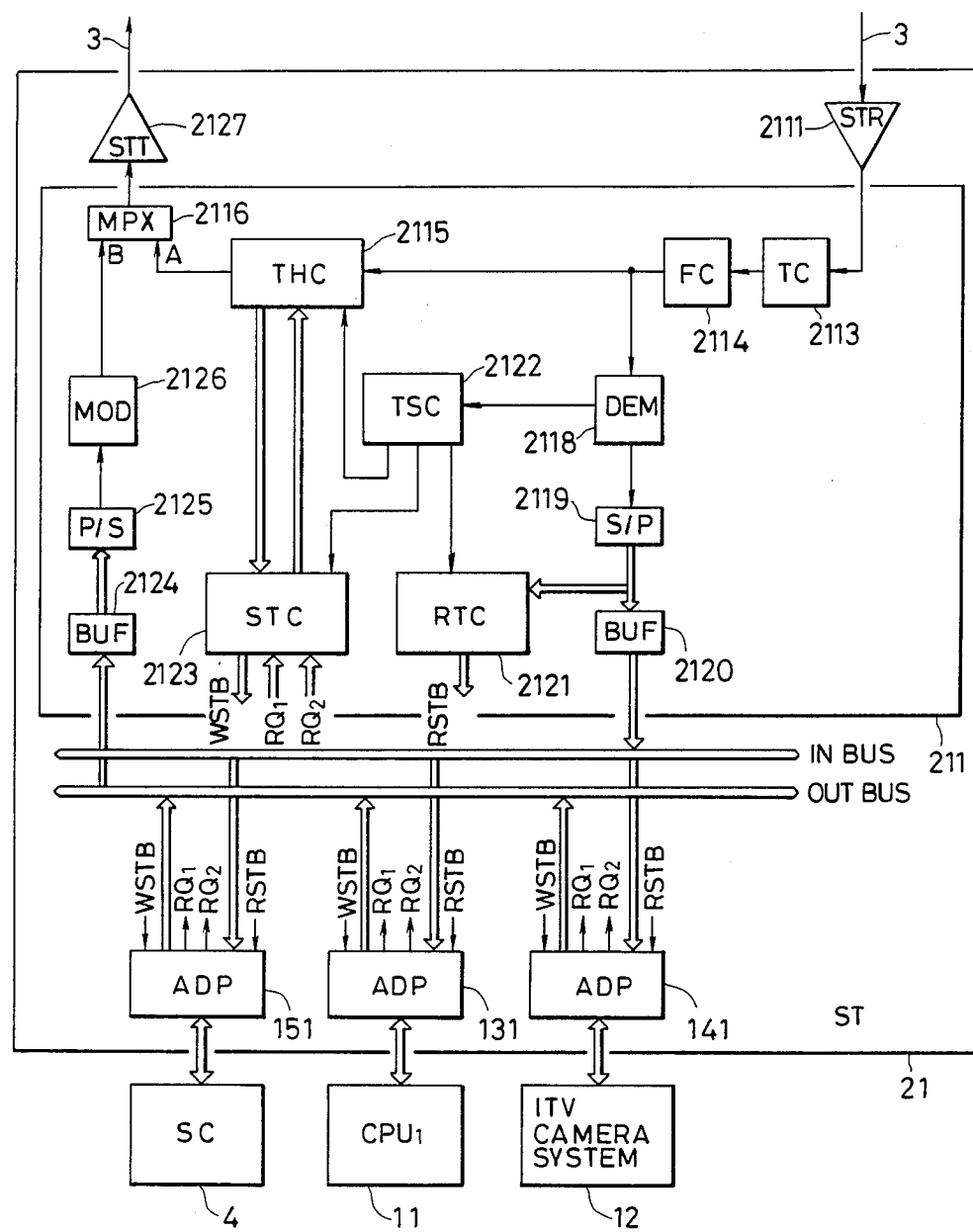
FIG. 7 is a diagram showing the structure of the transmission station.

Next, the hardware structure of the transmission station is shown in FIG. 7. Here is shown an example of the transmission station 21 because all the transmission stations have the same structure. In the system, only one station concurrently operates as the transmission control station. Here, the transmission control station performs those functions necessary to generate and monitor the frame signals and to compensate for the loop round-trip delay. A receiver (STR) 2111, a timing converter (TC) 2113 and a transmitter (STT) 2127 are made to have the same functions as those used in the stream changer shown in FIG. 5, and their repeated explanations are avoided. As other components, a frame controller (FC) 2114 adjusts the loop round-trip delay to an integral number of frame periods, and is composed of components such as a two-port memory and an input-/output timing controller. A time slot header controller (THC) 2115 executes the monitor and write of the F/B bit and the P/C of the time slot header unit, as has been described in FIG. 4. A multiplexer (MPX) 2116 executes the change-over between the repeat data and the data sent from a self-station as the data sent from the sending station. A demodulator (DEM) 2118 converts the Manchester-coded signal on the transmission line to an NRZ (i.e., No Return to Zero) data. The frame synchronization character SYN shown in FIG. 4 can be detected by the present circuit if it is composed of a code violation. A modulator (MOD) 2126 executes the inverse conversion. A serial/parallel converter (S/P) 2119 and a parallel/serial converter (P/S) 2125 are constructed of shift registers, respectively. Buffer registers (BUF) 2120 and 2124 are buffer registers connected between a connector interface data bus and a transmission control. A time slot controller (TSC) 2122 counts and generates the timing for the time slot recognition and is composed mainly of a counter. The initialization of the counter is effected by detecting the frame synchronization character at the demodulator (DEM) 2118.

A received data transfer controller (RTC) 2121 supplies timing for transferring the data of the time slot addressed to the self-station to connecting equipment. A sent data transfer controller (STC) 2123 executes various kinds of controls for capturing the corresponding time slot and transferring the data sent out from the connection equipment.

The sent data is taken from the transmission line 3 into the receiver (STR) 2111 and is sent out again to the transmission line 3 via the timing converter (TC) 2113, the frame controller (FC) 2114, the time slot header controller (THC) 2115, the multiplexer (MPX) 2116, and a sender (STT) 2127. Simultaneously with this, the output of the frame controller (FC) 2114 is also fed to the demodulator (DEM) 2118 and is therefore transferred via the series/parallel converter (S/P) 2119 and, in the case of the data assigned to the self-station, further via the buffer register (BUF) 2120, a connection equipment interface data bus INBUS and the adaptors 131, 141 and 151 to the connection devices 11, 12 and 4. Conversely, data sent from the connecting devices 11 and 12 are sent out via the adaptors 131 and 141, a connection equipment interface data bus OUTBUS, the buffer register (BUF) 2124, the parallel/series converter (P/S) 2125, the modulator (MOD) 2126, the multiplexer (MPS) 2126 and the sender (STT) 2127 to the transmission line 3. The operations of the present transmission station will be described in more detail with reference to the processing flow charts shown in FIGS. 8 to 11.

Figure 8:
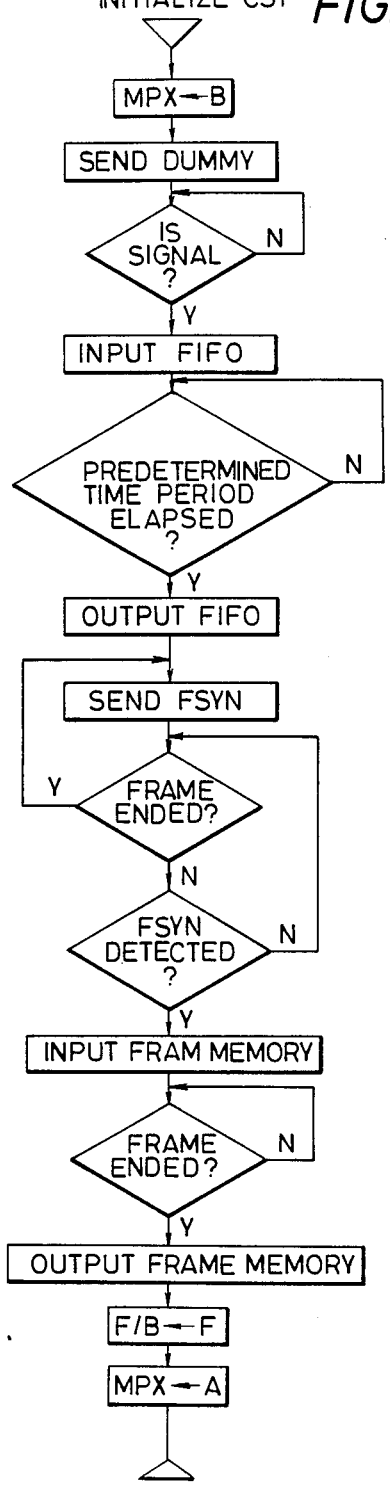
FIGS. 8, 9, 10 and 11 are flow charts showing the operations of the respective portions of the time slot multiplex control unit.

FIG. 8 shows the initialization processing flow up to the establishment of the frame synchronization in case the present transmission station operates as the transmission control station. Moreover, this will explain the operations of the frame controller 2124 and the timing converter 2113. First of all, the multiplexer 2116 is set at side B to start the sending operation of dummy data and to confirm that it circulates around the loop. In the next step, the establishment of the timing conversion is realized by using the received clock pulse as the input timing of the FIFO register and by using the sent clock pulse as the output timing of the FIFO register after the storage of predetermined bit data has been completed. In accordance with this stored bit data, the phase difference and fluctuations of the clock pulse which was sent and the one which was received are absorbed. When round-trip delay compensation of the loop is accomplished, the modulator (MOD) 2126 is instructed to send out the frame synchronization character SYN. After this, simultaneously with sending out the dummy data, the frame controller (FC) 2114 is instructed to start its operation. In response to this instruction, the frame controller (FC) 2114 begins storage of the data received subsequently, the return of the frame synchronism character SYN is detected, and then starts to take out the stored data in the order of receipt, when the end of the frame is detected. As a result, the aforementioned delay can be compensated. After this, the multiplexer (MPX) 2116 is switched to side A to start the relay of the data which is read out from the frame controller 2114. At this time, the header of each time slot in the frame is initialized so that each transmission station can perform its sending operation. When the present transmission station operates as an ordinary transmission station, the initialization may simply await the establishment of bit synchronization and frame synchronism, while the multiplexer 2116 is left at side A without any data storage in the frame controller (FC) 2114.

Figure 9:
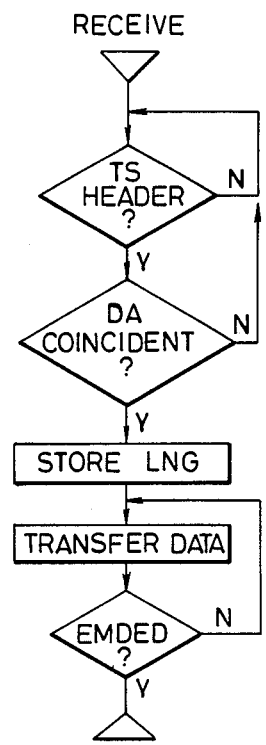

FIG. 9 not only shows the processing flow of the receiving operation at each transmission station, but also explains the operation of a received data transfer controller (RTC) 2121. The data received after establishment of the frame synchronization is introduced via the demodulator (DEM) 2118 and the series/parallel converter (P/S) 2119 into the received data transfer controller (RTC) 2121. This received data transfer controller (RTC) 2121 checks and stores the designated address character DA and the data length character LNG in response to the signal coming from the time slot controller (TSC) 2122, indicating that the time slot header data is present. When the address is designated to the self-station, the corresponding adaptor is instructed to take in the content of the buffer register (BUF) 2120. How many bytes are to be transferred depends on the data length character stored in advance.

Figure 10:
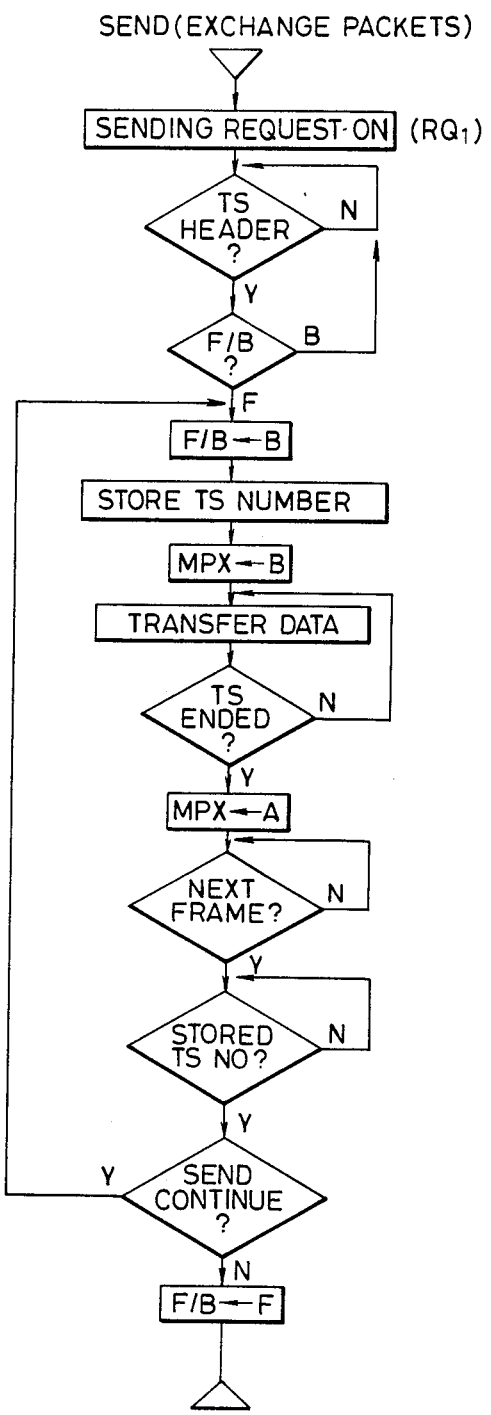

FIG. 10 shows the data sending processing flow of the packet change-over type. With reference to FIG. 10 and subsequent FIG. 11, a detailed description will be based mainly upon the operations of the sent data transfer controller (STC) 2123 and the time slot header controller (THC) 2115. For example, a request $RQ_1$ output from the connection equipment 11 for packet switching is sent via the adaptor (ADP) 131 to the send data transfer circuit (STC) 2123. Here, which equipment the request comes from is determined and this information is passed to the time slot header controller (THC) 2115. The time slot header controller (THC) 2115 checks the F/B bit of said time slot in response to the time slot header detection signal from the time slot controller 2122. If F (free), this is changed to B (busy) and communicated to the sent data transfer circuit (STC) 2123. This sent data transfer circuit (SC) 2123 instructs an adaptor (ADP) 131 to transfer the data and the multiplexer (MPX) 2116 to select the B side thereby to perform the sending operation. The time slot number used at this time is read in and stored by the time slot controller (TSC) 2122. When a sending operation involving one or more time slots is desired, it is necessary to await one cycle for the same time slot of the next frame. When sending is complete, the busy bit of said time slot is rewritten to the free one.

Figure 11:
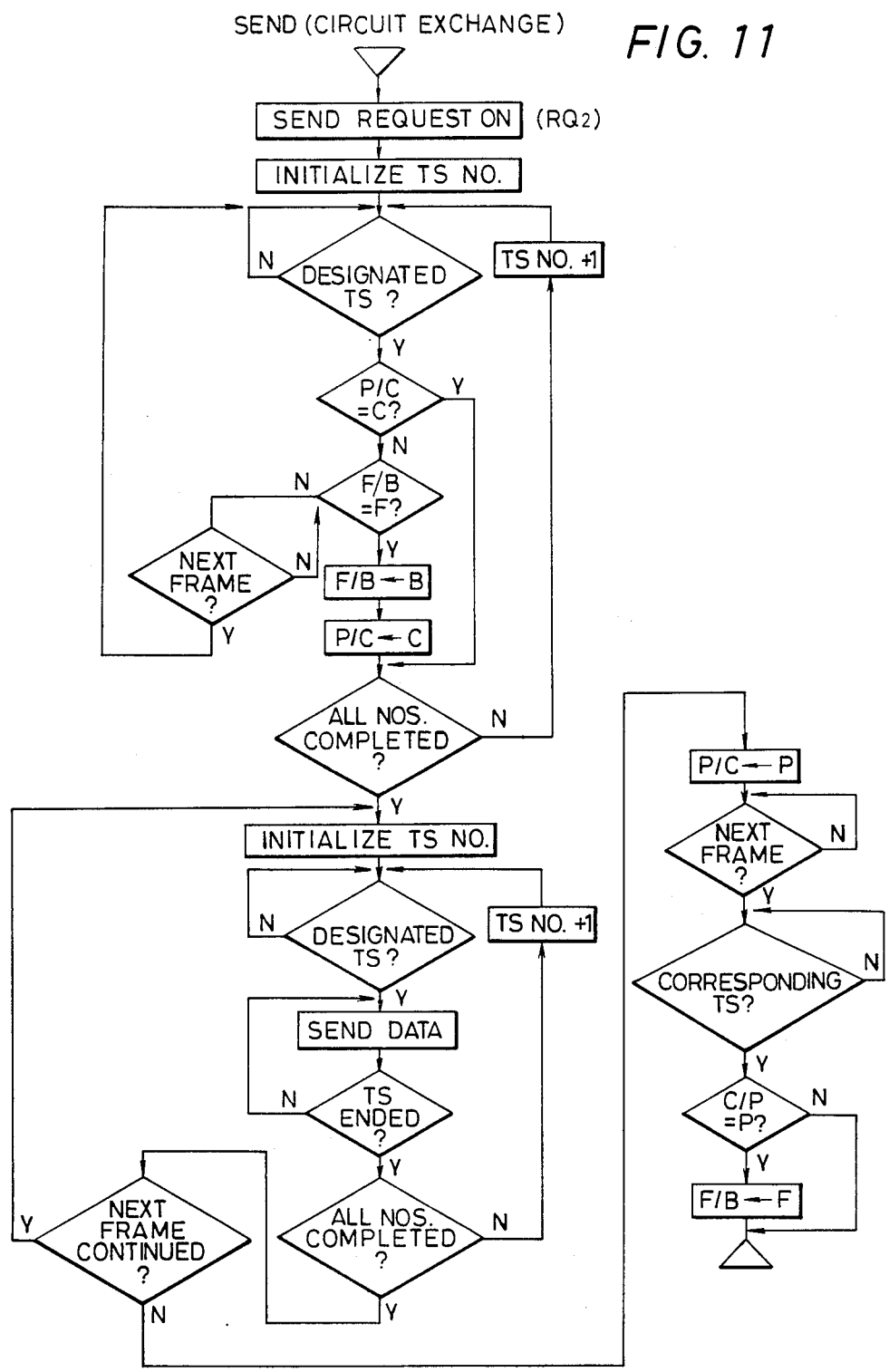

FIG. 11 shows the data sending processing flow of circuit exchange type. For example, a data sending requires $RQ_2$ of circuit switching type sent out from the connection equipment is sent via the adaptor (ADP) 141 to the sent data transfer circuit (STC) 2123. Here, which equipment has made the request is determined and that information is given to the time slot header controller (THC) 2115. In the present embodiment, when the time slot used is of the circuit switching type, as shown in FIG. 4, its applicable range is determined in advance. On the basis of the time slot number supplied by the time slot controller (TSC) 2122, the time slot header controller (THC) 2115 checks the P/C bit of the corresponding time slot to examine whether it has already been used for the circuit switching type transfer. If that bit is used for the packet switching, the system waits for that time slot until it is free. When the time slot is free, it is changed to the busy state. Simultaneously with this, the use of the circuit switching type is written in the P/C bit. This busy state is repeated by the number of the time slots required by said equipment 12. When the occupation of all slots is accomplished, moreover, data transfer is executed such that the sent data transfer controller (STC) 2123 sends the adaptor (ADP) 141 a read strobe signal WSTB and such that the multiplexer (MPX) 2116 is set at the B side. Once data transfer of the circuit switching type is started, the same time slot cannot be used for the packet switching type transfer because the F/B bit of the time slot header remains busy. When the end of the transmission is desired, the P/C bit of the time slot header is rewritten from circuit switching use to packet switching use. If a check of the same bit after one loop cycle reveals that it is unchanged, the F/B bit is changed to be free because no other transmission stations use that time slot. If said bit is rewritten to the circuit switching use after one loop circulation, the transmission is terminated without any operation because the other transmission stations still use the same. When no request for data transfer of the circuit switching type is made, said time slot can be used for data transfer of the packet switching type by the control thus far described so that the transmission lines can be used more effectively.

Next, the changing of connection order at the stream changer 4 will be described in the following. This change-over method can be first divided roughly into the following two:

(1) The relationship of the circuit switching equipment is fixed, and the connection order is set by the manual switch shown in FIG. 6 when the system is constructed.

(2) The relationship of the circuit switching equipment can be freely changed, and the connection order is dynamically changed in accordance with the demand from each device.

Since a further description of the method (1) is unnecessary, the method (2) will be described hereinafter. The realization of the method (2) is further classified, as follows:

(2-1) The stream changer directly receives and executes the demand from each device.

(2-2) A predetermined transmission station receives and sends the demand to the stream changer.

The latter is further divided into the following two methods in accordance with how to send the instruction.

(2-2-a) The instruction passes through the transmission lines.

(2-2-b) The instruction passes through the equipment interface bus of the transmission station, as shown in FIG. 1.

The quantity of the hardware required of the stream changer is the most for the system (2-1) and can be minimized for the system (2-2-b). No matter what method might be adopted, the procedures of the control are basically identical, and the system (2-2-b) will be described in connection with the following embodiment.

Figure 12:
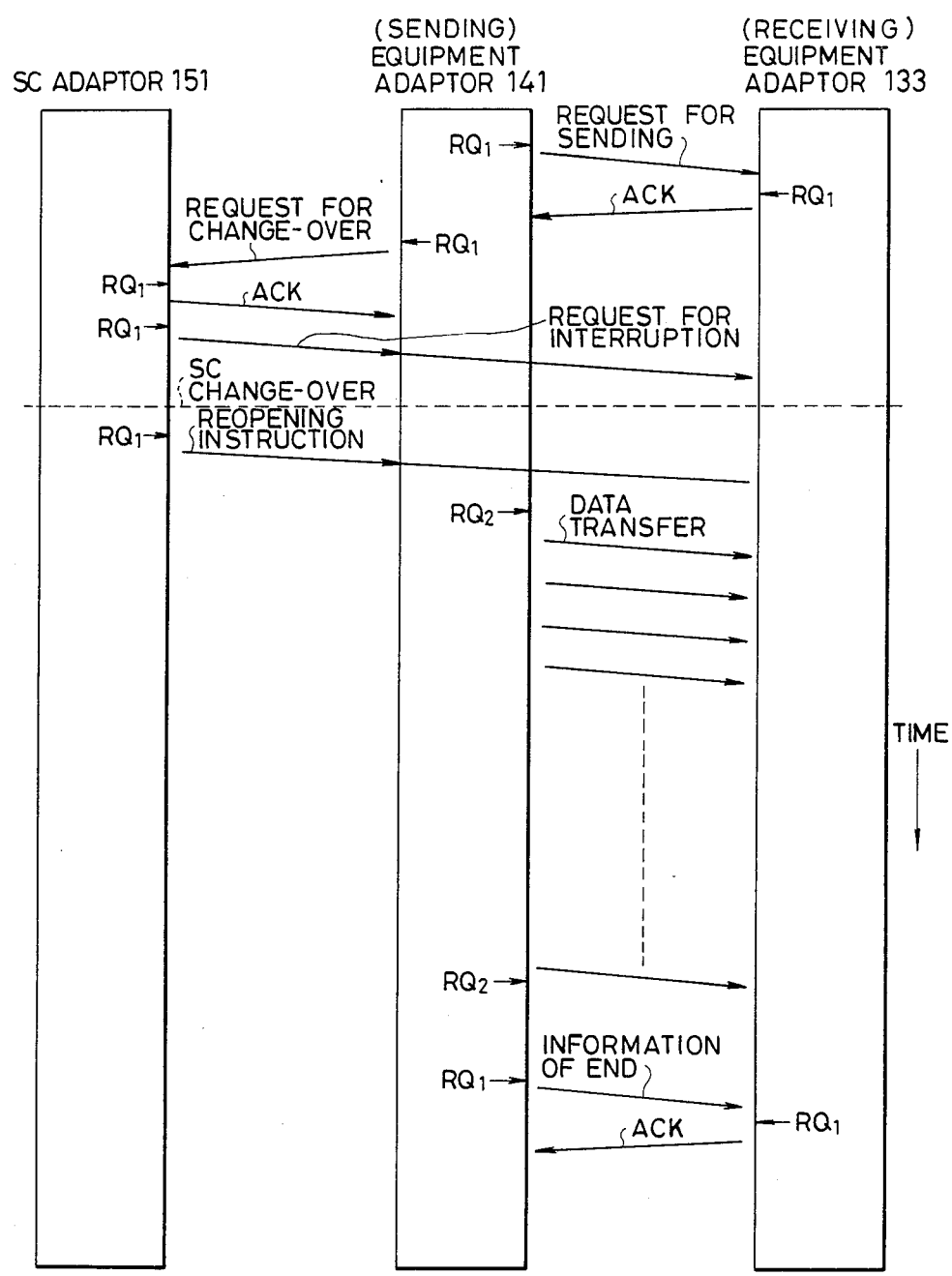
FIG. 12 is a data transfer flow between the adaptors.

First of all, the summary of the operations will be explained with reference to the time chart of FIG. 12. In this Figure, all three adaptors are shown: the respective adaptors 141 and 133 for connecting the sending and receiving equipment with the time slot multiplex controlling unit; and the SC adaptor 151 for connecting the stream changer. The time lapse is shown downward of the drawing. The transmitting procedures are:

(1) The data sending demand of circuit switching type is generated by some connection equipment and is transmitted to the adaptor 141.

(2) In response to this, the adaptor 141 prepares the connection demand data to generate the request $RQ_1$ to the time slot multiplex controlling unit.

(3) This time slot multiplex controlling unit captures the free time slot to send out said data.

(4) In response to this, the time slot multiplex controlling unit transfers it to the corresponding equipment adaptor 133, which informs the connection equipment of it.

(5) The connection equipment at the reception side returns an answer depending upon whether it is busy.

(6) The adaptor 133 sends the answer data in accordance with the procedure like the aforementioned (2) and (3).

(7) In response to the answer data, the adaptor 141 sends it again after a predetermined time if the data is a negative answer (NAK). If the data is an affirmative answer (ACK), the adaptor 141 sends a change-over demand to the SC adaptor 151.

(8) In response to this instruction, the SC adaptor 141 first returns the answer indicating the reception of that instruction to the adaptor 141 and then instructs all of the adaptors to interrupt sending. Next, the stream changer is instructed to change the order of connection. After this, all the adaptors are also instructed to restart the sending operations. The adaptors having interrupted the sending operations restart them whereas the adaptor 141 sends a circuit switching type of sending request ($RQ_2$) to the time slot multiplex controlling unit.

(9) The adaptor 141 instructs the connection equipmnent to send out the data thereby to conduct the data transfer. In response to this, the adaptor 133 transfers it to the connection equipment.

(10) In response to the send ending instruction, the adaptor 141 again feeds the request $RQ_2$ to the time slot multiplex controlling unit to interrupt the data sending operation and to inform the adaptor 133 of the end.

(11) In response to this, the adaptor 133 returns an answer indicating the reception and reports the end to the connection equipment.

Figure 13:
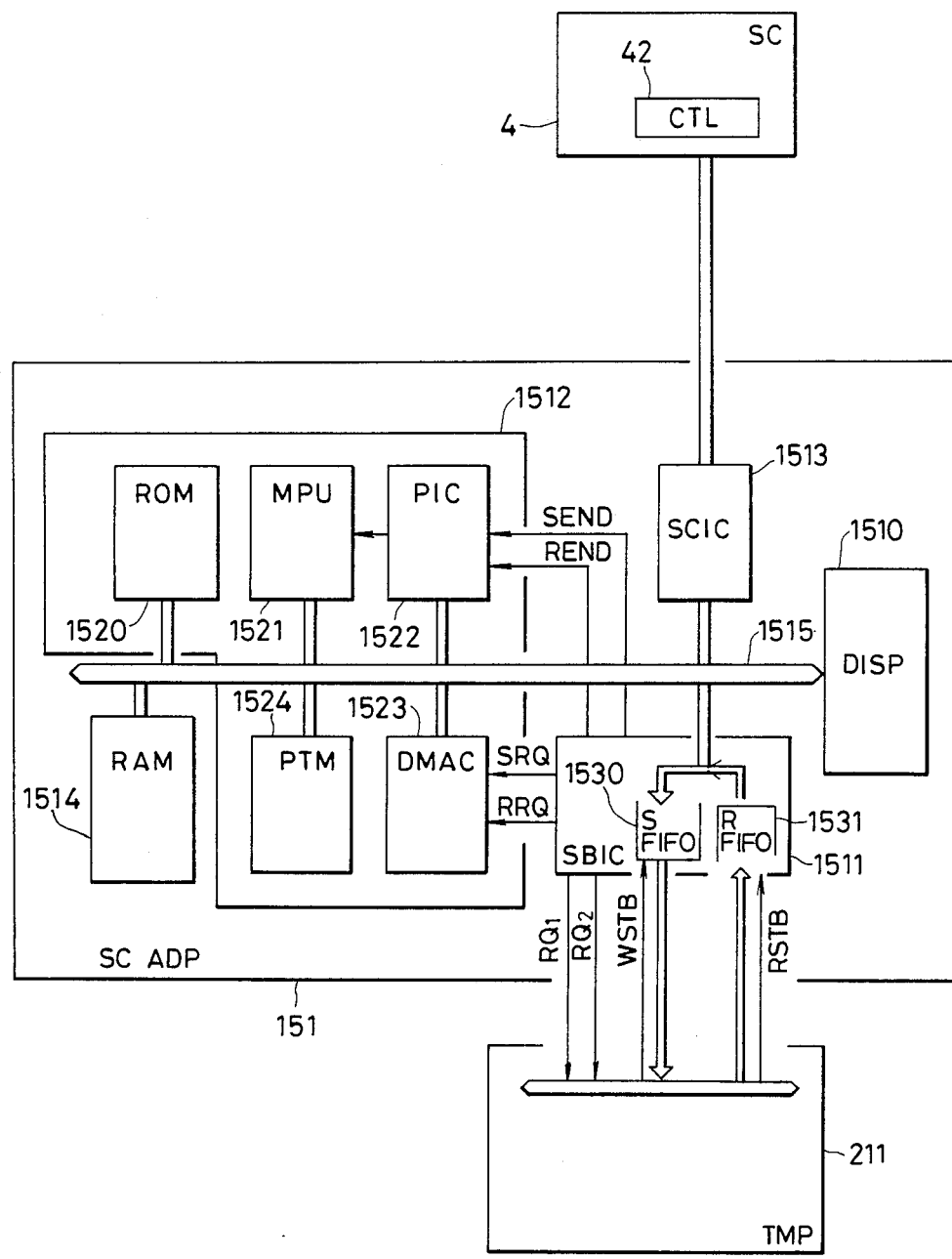
FIG. 13 is a diagram showing one embodiment of the adaptor 151 of FIG. 7.

FIG. 13 shows the hardware structure of the aforementioned SC adaptor 151. This is a device for setting the transmission station connection order externally for the stream changer 4 from the outside and is constructed of the following components:

(1) an instruction interface circuit (SCIC) 1513 for transferring an instruction to the stream changer;

(2) a memory (RAM) 1514 for storing the instant transmission station connection order;

(3) a display (DISP) 1510 for displaying the instant transmission station connection order;

(4) a transmission interface circuit 1511 for controlling data transfer with a time slot multiplex controlling unit (TMP) 211;

(5) a processor 1512 for outputting an instruction to the stream changer 4 from the change-over demand received and the instant transmission station connection order and transfers the various sent data to the time slot multiplex control unit (TMP) 211.

(6) an internal bus 1515 for mutually connecting the respective circuits described above.

The processor 1512 is composed primarily of a microprocessor (SCADP) 1521, an interruption controller (PIC) 5122, a high-speed memory transfer controller (DMAC) 1523, a timer controller (PTM) 1524, a program memory (ROM) 1520. The change-over demand to be transferred from the time slot multiplex control unit (TMP) 211 is introduced into the FIFO memory 1531 in the transmission interface circuit (SBIC) 1511 and is then written in the memory (RAM) 1514 by the high-speed memory transfer controller (DMAC) 1523 until it is judged by the microprocessor (MPU) 1521. The answer to the change-over demand and the instructions to interrupt and restart sending are stored in memory from the microprocessor (MPU) 1521 and are then stored in the FIFO register 1530 in the transmission interface circuit (SBIC) 1511 by the high-speed memory transfer controller (DMAC) 1523 until they are sent out to the time slot multiplex control unit. On the other hand, the same are written directly in the switching control means 42 in the stream changer 4 from the microprocessor (MPU) 1521 via the instruction interface circuit (SCIC) 1513.

Figure 14:
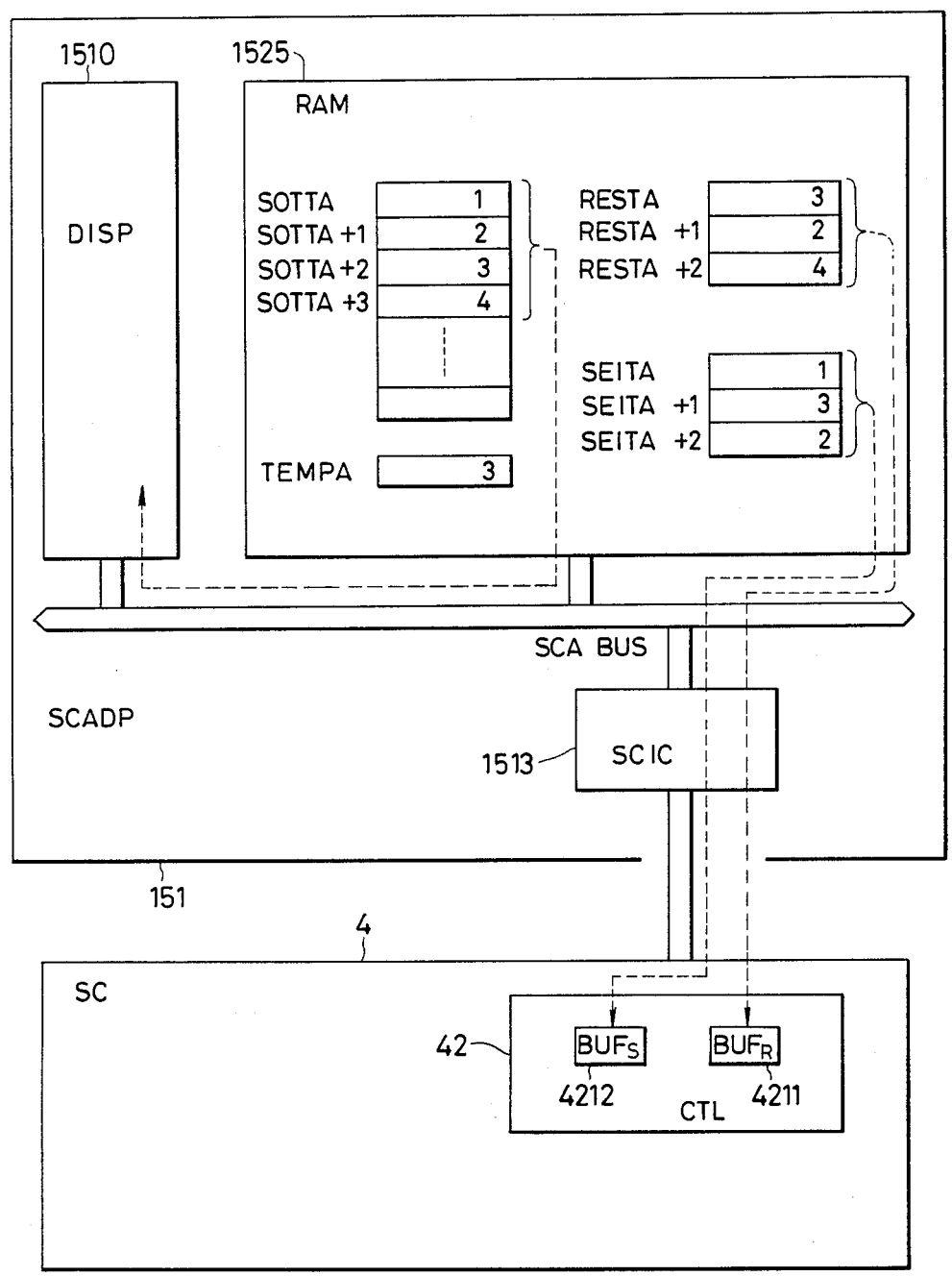
FIG. 14 is a schematic diagram for explaining the operations.

The procedures in which the SC adaptor 151 changes the stream changer 4 will be described in more detail with reference to the schematic diagram of FIG. 14. In this example, it is assumed that there are four transmission stations and that the immediate connection order is 1, 2, 3, 4, 1, and --- and so on, as shown in a memory (RAM) 1525 in the SC adaptor 151. Here, the leading address of the present table is indicated at SOTTA, and the number of steps from that address indicates the connection order. Now, it is assumed that the transmission station 1 receives a change-over instruction to the transmission line 3. At this time, the processor prepares the instruction to set the two buffer registers 4211 and 4212 in the switching control means 42 of the stream changer 4 by the instant transmission station connection order tables SOTTA+3 in the following manner. The instruction to be stored in the register 4211 is composed of the following three words having a memory address RESTA as a header:

(a) RESTA Receiving Station Address (3);

(b) RESTA+1 Receiving Just Upstream Station Address (2); and (c) RESTA+2 Receiving Just Downstream Station Address (4).

The instruction to be stored in the register 4212 is composed of the following three words having a memory address SEITA as a header:

(d) SEITA Sending Station Address (1);

(e) SEITA+1 Receiving Station Address (3); and (f) SEITA+2 Sending Just Downstream Station Address (2).

Figure 15A:
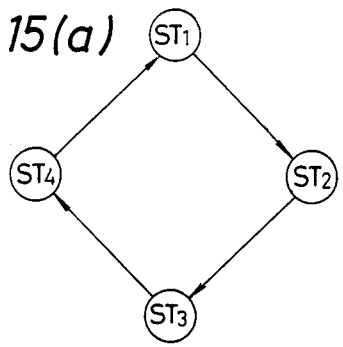
FIG. 15($a$)–15($d$) are schematic diagrams of the station order change-over.
Figure 15B:
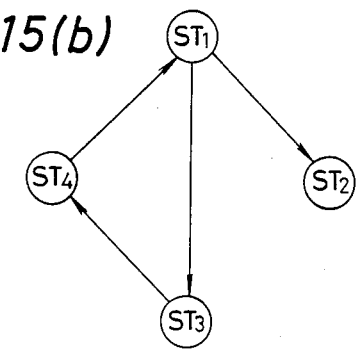
Figure 15C:
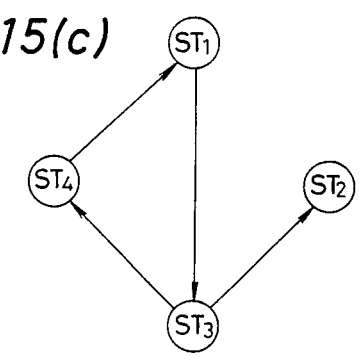
Figure 15D:
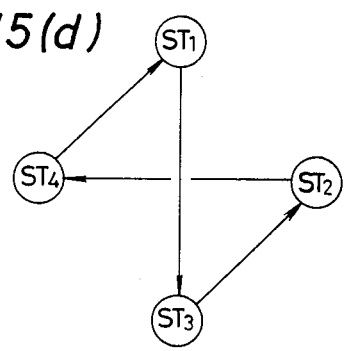

After this, the instant transmission station connection order table is renewed. The procedures are followed by temporarily storing the receiving station address (3) in a memory address TEMPA and by pushing all the memory contents down by one word from the memory address (SOTTA+1) stored with the sending just downstream station address (2) to the memory address (SOTTA+2) stored with the receiving station address (3). Then, the address SOTTA+1 has its content lost, and the address SOTTA+2 is entered by 2. After this, the content (3) temporarily stored in the TEMPA is transferred to the memory address (SOTTA+1) in which the sending just downstream station address has been present before. As a result, the order of connection of the transmission stations is 1, 3, 2, 4 and 1. This order is sent to the display (DISP) 150. For the switching control means 42, the content from the memory address RESTA may be transferred to the buffer register 4211, and the content from the memory address SEITA may be transferred to the buffer register 4212. FIG. 15 shows how the order of connection of the transmission stations is caused to change by the aforementioned transfers. FIG. 15(a) shows the mode before the change. The content of the memory address RESTA is transferred to the buffer register 4211, and the content of the SEITA is transferred to the buffer register 4212 for writing as shown in FIG. 15(b). Like the above, FIG. 15(c) is obtained if the content of the address RESTA+1 is transferred to the registers 4211 and 4212. Moreover, the final mode of FIG. 15(d) is obtained if the content of the address RESTA+2 is transferred to the registers 4211 and 4212.

Even when a large amount of traffic requiring a high-speed and large capacity transmission channel such as a digital video signal occurs in the system, according to the present invention, they can be accommodated by the circuit exchange using the same time slot. As a result, the transmission performance of the loop transmission system can be drastically improved.

We claim:

1. A loop transmission system for conducting data transmission among a plurality of transmission stations, and in which a plurality of said transmission stations have data processors connected thereto comprising:
- a plurality of transmission stations, each transmission station having a receiver for receiving data and a transmitter for transmitting data, said receiver and said transmitter in each station being connected to a respective transmission line to provide a data input line and a data output line for said transmission station, respectively, and outputting means for transmitting a switching request signal on the data output line of the transmission station; and
- a concentrator connected to said plurality of transmission stations via said respective transmission lines in such a manner as to selectively form a series transmission loop through said concentrator in which said transmission stations are connected in series in a selected order, said concentrator including switching means for changing the connection relationship between a number of data input lines and the same number of data output lines of the transmission stations connected thereto so that said stations are connected in series in any arbitrary order, and switching control means responsive to said switching request signal for outputting switching commands to said switching means to control the connection relationship of said transmission stations in said series transmission loop to connect said stations in series in an order indicated by said switching request signal.

2. A loop transmission system as set forth in claim 1, wherein said switching means includes a plurality of multiplexers, each for selecting one of the plural data input lines and connecting it with a predetermined one of the data output lines of said transmission stations.

3. A loop transmission system as set forth in claim 1, wherein said switching control means includes a plurality of registers for storing switching commands and means for writing data in said registers.

4. A loop transmission system as set forth in claim 1, wherein said switching means includes a plurality of multiplexers for selecting one of plural data input lines and connecting it with a predetermined one of the data output lines of said transmission stations, and said switching control means includes a plurality of registers for storing switching commands and means for writing data in the registers.

5. A loop transmission system as set forth in claim 3, wherein said data writing means in said switching control means includes means for writing data by means of a setting switch, means for writing data by means of external setting means and a change-over switch for selecting data from the setting switch or data from the external setting means in said registers.

6. A loop transmission system as set forth in claim 5, wherein said external setting means includes means for transferring the switching commands to the switching control means, means for storing the connection order of the transmission stations; and processor means for sending commands to said switching control means based on station order data received from the transmission stations, through said series transmission loop and for outputting said station order data to the transmission lines.

7. A loop transmission system as set forth in claim 1, wherein said system includes a plurality of concentrators interconnected in such a way that the plural transmission stations connected to different concentrators may be selectively interconnected to form a series transmission loop.

8. A loop transmission system as set forth in claim 1, wherein at least one of said transmission stations is connected to receive said switching request signal from said series transmission loop, judging means for determining whether said switching means is to be controlled to change the order of connection of said stations, and means responsive to said judging means for actuating said switching control means.

* * * * *